United States Patent [19]

De Mendoza Sans

[11] Patent Number: 5,038,536
[45] Date of Patent: Aug. 13, 1991

[54] SYSTEM FOR STABILIZING AND ACCESSING A HIGH BUILDING

[76] Inventor: Juán De Mendoza Sans, Av. Diagonal, 446, 60, 08006 Barcelona, Spain

[21] Appl. No.: 558,811

[22] Filed: Jul. 27, 1990

Related U.S. Application Data

[63] Continuation of Ser. No. 219,470, Jul. 14, 1988, abandoned.

[30] Foreign Application Priority Data

Jul. 16, 1987 [ES] Spain .................................. 87/02330

[51] Int. Cl.⁵ ............................................ E04H 12/20
[52] U.S. Cl. .......................................... 52/146; 52/140; 52/152; 182/11
[58] Field of Search .................................. 52/146-152, 52/173; 185/10, 11, 191-193

[56] References Cited

U.S. PATENT DOCUMENTS

| 444,308 | 1/1891 | Stevenson | 182/11 |
| 1,281,201 | 1/1918 | Peterson | 52/146 |
| 3,013,640 | 12/1961 | Nehibass | 52/148 X |
| 3,388,512 | 6/1968 | Newman | 52/152 X |
| 3,826,335 | 7/1974 | Allen | 182/10 |
| 4,256,199 | 10/1981 | Sellards | 182/11 |

FOREIGN PATENT DOCUMENTS 937674 6/1982 U.S.S.R. .................................. 182/10

Primary Examiner—Richard E. Chilcot, Jr.
Attorney, Agent, or Firm—Michael J. Striker

[57] ABSTRACT

A high building is provided with a permanent bracing system which also serves for accessing upper levels of the building. The bracing system includes inclined guys permanently attached at mounting points at an upper level of the building and being anchored on the ground at points spaced apart from the building. At least one of the bracing guys supports a transportation device commuting along the guy between the ground and the upper level.

3 Claims, 1 Drawing Sheet

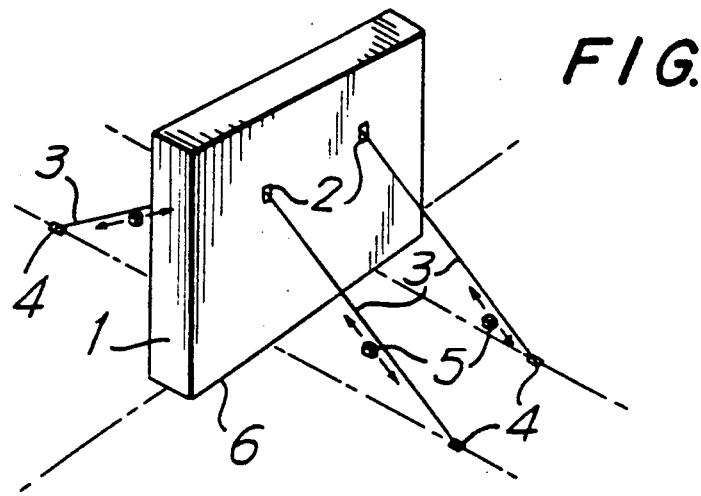
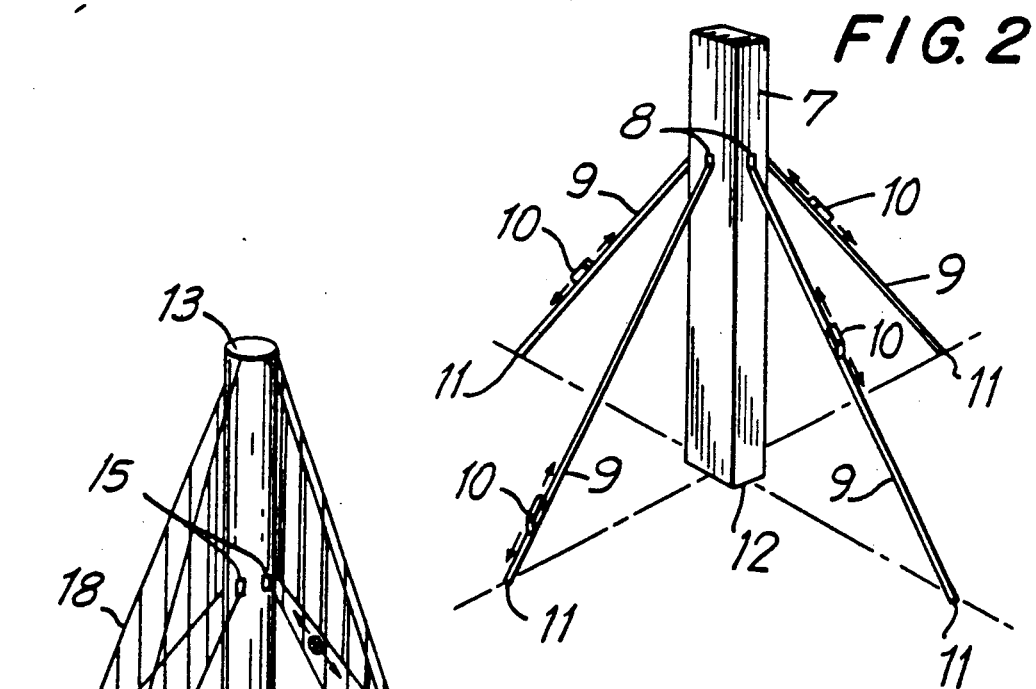
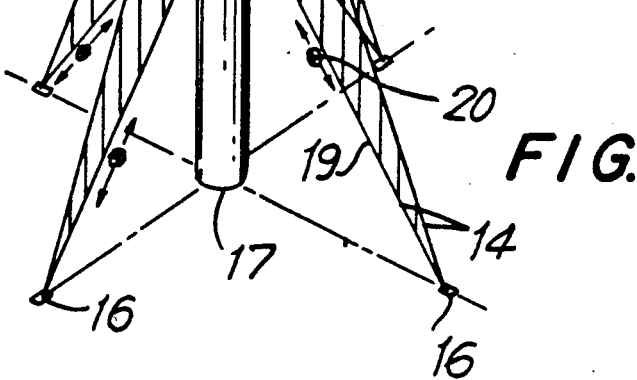

ical of the
SYSTEM FOR STABILIZING AND ACCESSING A HIGH BUILDING

RELATED APPLICATIONS

This application is a continuation of application Ser. No. 219,470, filed on July 14, 1988, now abandoned, and entitled "Improvements In Stabilization and Evacuation of High Buildings."

BACKGROUND OF THE INVENTION

This invention refers to improvements in the stability and evacuation of high buildings based on the attachment of accesses to the high parts of the buildings which accesses at the same time act as bracing elements for the buildings to oppose nonvertical forces such as wind or an earthquake.

SUMMARY OF THE INVENTION

The accesses according to the invention consist of inclined, physical elements that join high parts of the building with points on the ground at a distance from the base, the said elements being fitted with attached, hanging, integrated or supported transferring mechanisms such as cabins or wagons, as well as with the ropes or tracks to support or move them.

The improvements in the stability and acessibility of high buildings of the present invention solve at the same time the following two problems that are typical of the high buildings.

The first problem solved is the stability as regards the wind or an earthquake. Conventionally, the stability is solved by means of sufficiently dimensioning the ground base area of the building so as to counteract the toppling effect produced by these forces. However, this involves a limitation of the slenderness of the buildings, i.e. of their height/base ratio. The system of the invention allows to considerably increase the this ratio because points for fastening the bracing structure are created at a high level the same as it is done at the masts of sailing ships.

The second problem solved is that of the deconcentration of the access to the building, since in the high buildings at present the whole traffic of persons or things has of necessity to pass through a gate at the ground zone, whereas with the system of the invention this zone would not be the only "entry and exit gate". The conventional solutions imply a limitation in the proportion between the area allotted to the vertical transferring elements such as lifts, staircases and services, and the total area of respective levels of the building.

By contrast, according to the invention direct accesses to higher levels are made available outside the building and from deconcentrated points away from the base of the building thus obtaining additional "gates". Consequently, the traffic from the ground floor will be substantially relieved, which also implies a considerable safety increase in the building because of creating access and evacuation alternatives other than the base gate. As a consequence the inclined bracing elements contribute to the stability and accessibility of the building, thus allowing the building to be slenderer, i.e. to be constructed higher with the same ground-plan surface.

BRIEF DESCRIPTION OF THE DRAWINGS

The above and other objects, features, and advantages of the present invention will become apparent from the following detailed description, reference being made to the accompanying drawings in which:

FIGS. 1, 2, and 3 are largely schematic perspective views of buildings with stabilizing/evacuating systems according to the invention.

DETAILED DESCRIPTION OF PREFERRED EMBODIMENT

As seen in FIG. 1 a building 1 is connected at access locations 2 above the ground to the upper ends of inclined bracing ropes or guys 3 anchored on the ground at locations 4 spaced from the building and carrying pendant cabins 5 which allow persons and freight to gain access to upper levels of the building 1 without having to go through the ground floor 6 of the building 1.

In FIG. 2 a building 7 is connected at above-ground access locations 8 to bracing elements 9 which allow the building 7 to be made fairly slender. Cars 10 can ride on the bracing elements 9 from points 11 where they are anchored at a distance from the base or ground level 12 of the building 7.

FIG. 3 shows a building 13 provided with brace elements 14 that are connected to the building 13 at above-ground entrance levels 15 and to the ground at locations 16 spaced outward from the building 13. These elements 14 are formed by ropes 18 that serve only to prop and brace the building 13 and by ropes 19 which support pendant cabins 20. The ropes 18 and 19 together form an assembly.

The system of this invention allows a building to be made fairly slender and at the same time makes it possible to transfer people and freight into and out of the building. This transfer according to the invention solves a major safety problem with such slender buildings.

The following is being claimed as to the effects of the present Patent of invention:

1. A stabilizing and access system for a high building having entry- and exit-locations high above the ground, said stabilizing and access system comprising a plurality of inclined bracing elements, each element having an upper end permanently and immovably secured to the building at the entry- and exit-locations, and a lower end permanently and immovably anchored on a ground in a spaced relationship with respect to the building; and means displaceable along said inclined bracing elements for enabling regular transfer of persons and things from the entry- and exit-locations to the ground and from the ground to the entry- and exit-locations.

2. A stabilizing and access system as set forth in claim 1, wherein said displaceable means hangs from the bracing elements.

3. A stabilizing and access system as set forth in claim 1, further comprising secondary bracing elements serving solely for stabilizing the building and not associated with the displaceable means.

* * * * *